United States Patent [19]
Allison

[11] 4,217,501
[45] Aug. 12, 1980

[54] MOUNTING FOR WINDMILLS

[76] Inventor: William D. Allison, 39 Radnor Cir., Grosse Pointe Farms, Mich. 48236

[21] Appl. No.: 840,550

[22] Filed: Oct. 11, 1977

[51] Int. Cl.² ............................................. F03D 9/00
[52] U.S. Cl. ................................... 290/55; 416/121; 416/132 B; 290/44
[58] Field of Search ............... 290/55, 44; 416/121 A, 416/132 B; 248/339

[56] References Cited

U.S. PATENT DOCUMENTS

| | | | |
|---|---|---|---|
| 1,015,505 | 1/1912 | Moon et al. | 416/121 A |
| 1,876,595 | 9/1932 | Beldimano | 290/44 |
| 2,218,867 | 10/1940 | Beldimano | 416/121 A |

Primary Examiner—J. V. Truhe
Assistant Examiner—Morris Ginsburg
Attorney, Agent, or Firm—Fisher, Gerhardt, Crampton & Groh

[57] ABSTRACT

A windmill structure including a mounting for supporting one or a large number of windmills in an elevated position above the ground so that the windmills can weathercock and align with the wind. The mounting arrangement limits movement continuously in one direction and returns the windmill to its original position after it has turned in the same direction a predetermined amount.

11 Claims, 9 Drawing Figures

U.S. Patent  Aug. 12, 1980  Sheet 1 of 2  4,217,501
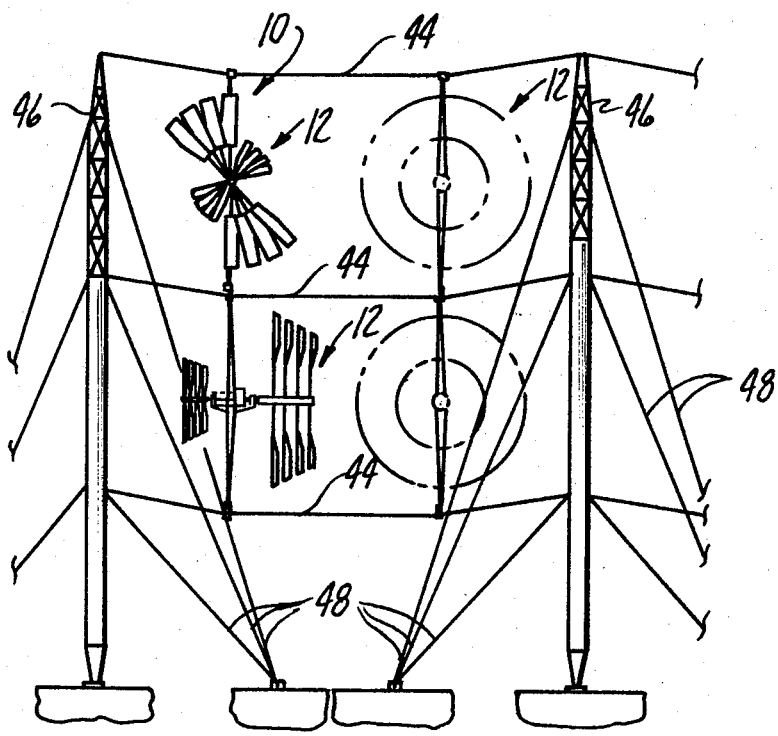
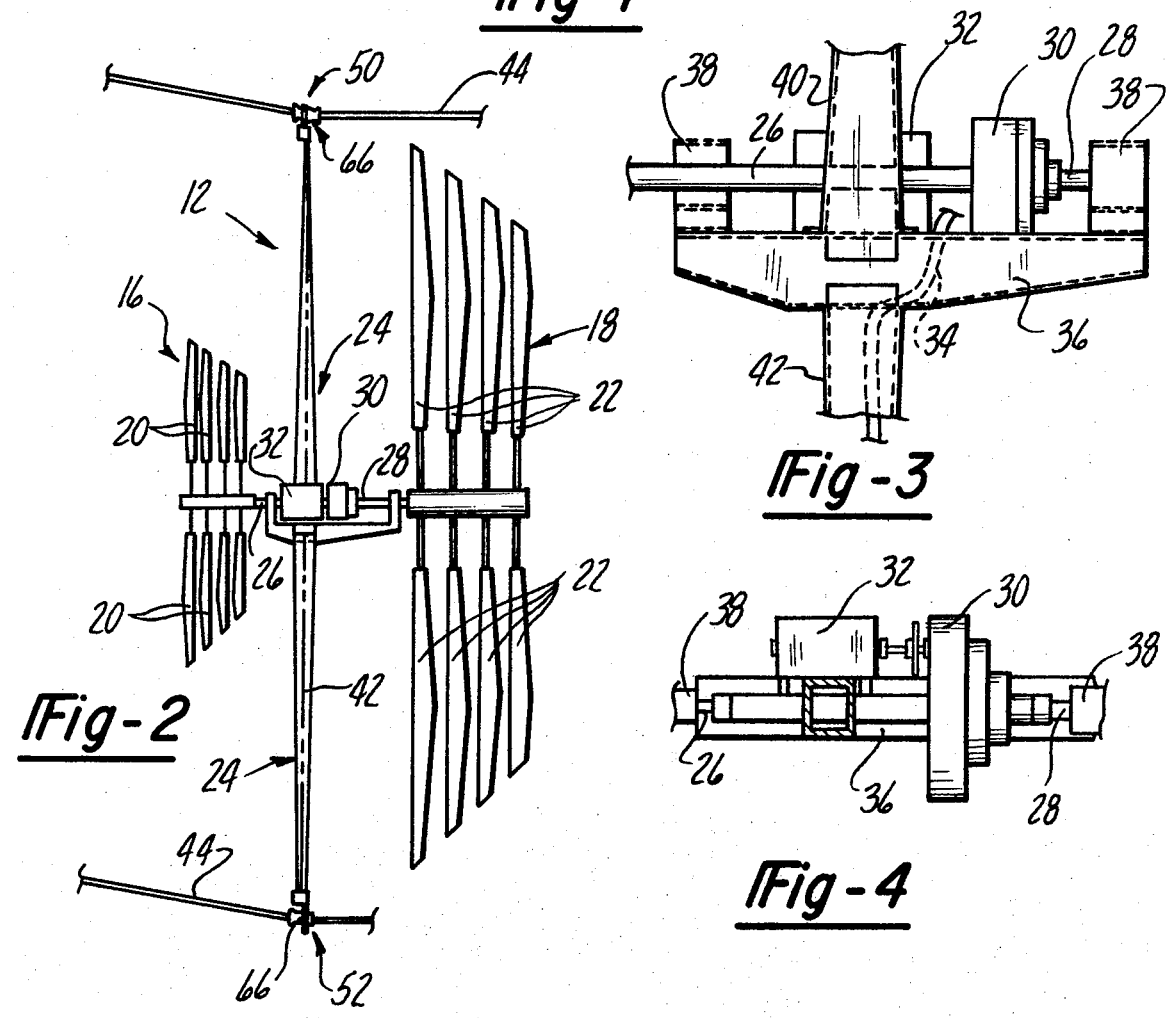

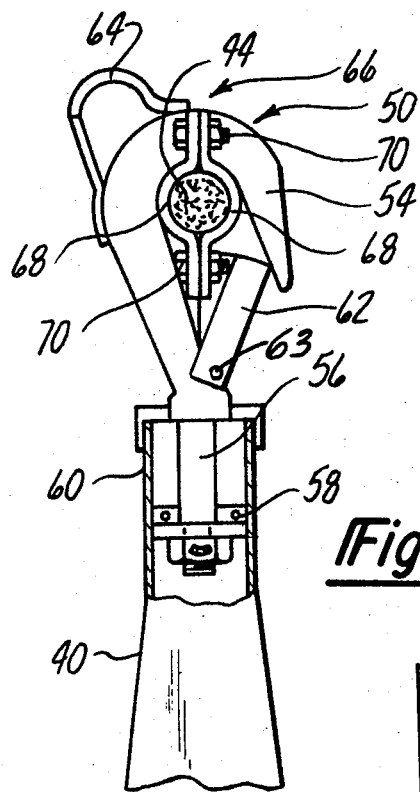
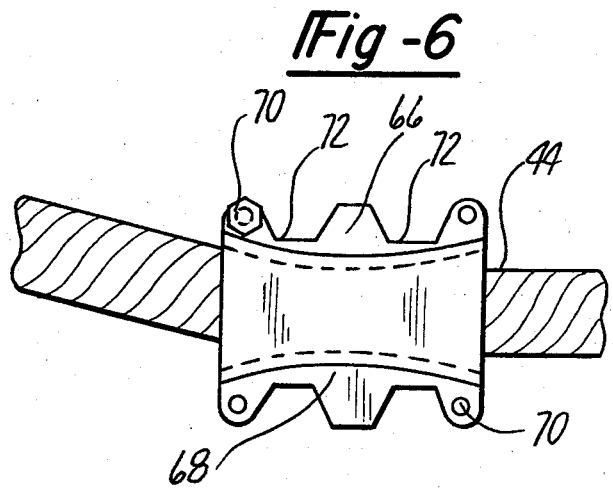
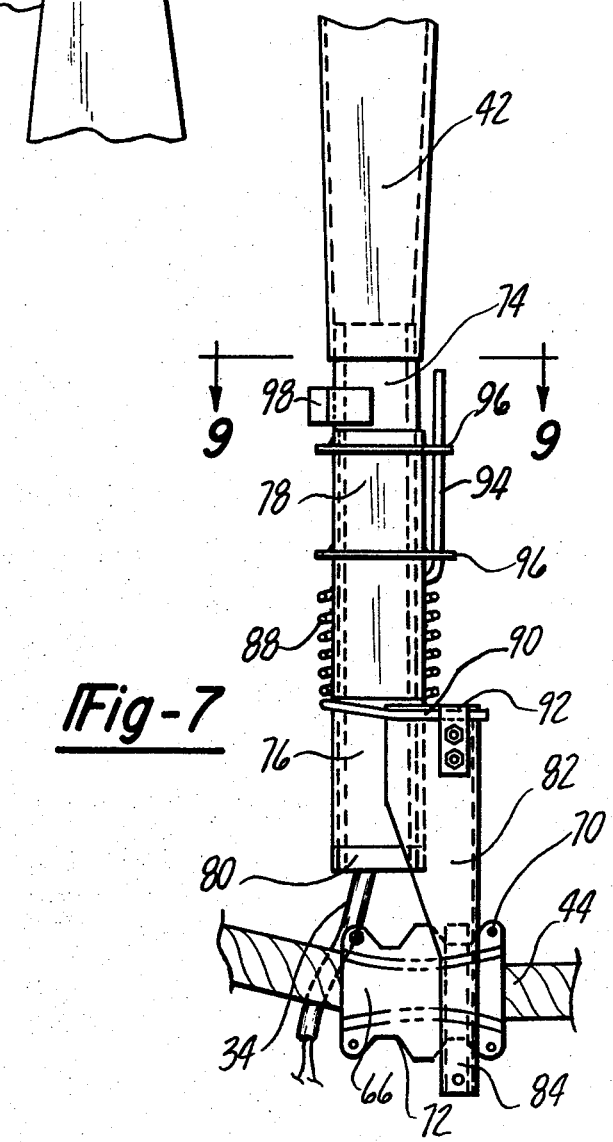
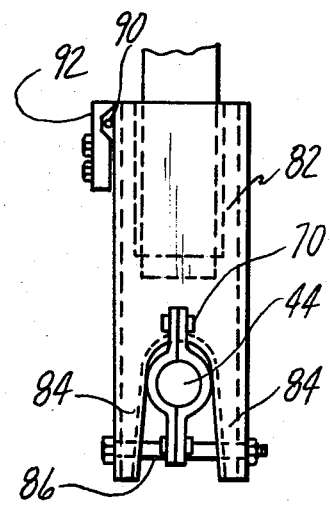
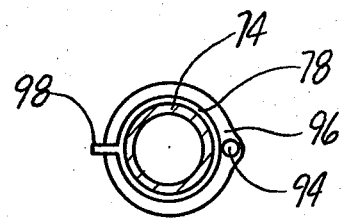
Fig-5
Fig-6
Fig-7
Fig-8
Fig-9

MOUNTING FOR WINDMILLS

This invention relates to windmills and more particularly to an arrangement for supporting windmills in an elevated position.

In order take advantage of wind without interference from elevated objects, windmills are supported in an elevated position and typically have a rigid tower as their base. As the elevation and size of windmills increases the tower or base must be made increasingly strong to resist various stresses imposed by the wind and rotation of the windmill. Also, windmills often are used to generate electricity and it becomes necessary to transmit electricity from the generator coupled to the windmill on a revolving platform to a stationary ground station by way of conductors. To avoid twisting of the electrical conductors it has been the practice to use slip rings which become extremely costly.

It is an object of the invention to provide a windmill structure including a mounting for windmills which is resilient and which reduces stresses transmitted by the wind or the windmill to the mounting structure.

Another object of the invention is to provide a windmill structure including a mounting which supports a windmill in an elevated position and permits easy installation and also removal for servicing and repair.

Another object of the invention is to provide a mounting arrangement for windmills in which a plurality of windmills may be supported adjacent to each other and at a reduced cost.

Still another object of the invention is to provide a mounting for windmills which affords the mounting of a large number of windmills in a given area without requiring extensive site preparation and without unduly impairing the use of the site for other purposes.

It is an object of the invention to provide a mounting for windmills in which the windmill is returned to its initial position after it has followed the direction of the wind a predetermined amount thereby avoiding excessive twisting of conductors and eliminating the need for expensive slip ring constructions.

The windmill structure embodying the present invention incorporates the use of suspended cables arranged to provide vertically spaced points by which windmill assemblies can be mounted through upper and lower swivel connectors. The swivel connectors permit the windmill assemblies to follow the direction of the wind and the cables serve to dampen vibrations and the like while at the same time making it possible to suspend one or a large number or windmill assemblies in an elevated position above the ground. The swivel connectors are such that electrical conductors passing from the generator adjacent to the windmill to a stationary ground transmitting station are allowed a limited amount of twist after which the windmill is returned to its original position and the requirement for slip rings is thereby obviated.

These and other objects of the invention will be apparent from the following description and from the drawings in which:

FIG. 1 is an elevation of the mounting of a plurality of windmills in accordance with the present invention;

FIG. 2 is an enlarged view of a windmill assembly shown in its relationship to cables of the mounting system;

FIG. 3 is a further enlarged view of a portion of the structure seen in FIG. 2;

FIG. 4 is a top view at an enlarged scale of the drive arrangement between the windmill and generators;

FIG. 5 is a view of a coupling member at the upper end of the windmill assembly seen in FIG. 2 but at an enlarged scale;

FIG. 6 is an enlarged view of one of the cable clamps seen also in FIG. 5;

FIG. 7 is a view similar to FIG. 5 but showing a coupling at the lower end of the windmill assembly;

FIG. 8 is a view of a portion of the structure seen in FIG. 7;

FIG. 9 is a sectional view taken on line 9—9 in FIG. 7.

Referring to the drawings a mounting structure embodying the invention is designated at 10 and includes a plurality of windmill assemblies 12. Each of the windmill assemblies 12 includes a horizontal axis windmill of the self wind aligning type and has two sets of vane assemblies making up a forward windmill or turbine 16 and a rearward windmill or turbine 18. The vanes 20 and 22 of the forward and rearward turbines 16 and 18 are arranged in pairs with each pair of the vanes 20 or 22 offset from the preceeding pair of vanes approximately 12 to 15 degrees and in the direction of rotation of the windmill. The vanes 22 of the rearward turbine 18 rotate in a path of larger diameter than the forward turbine 16 to take advantage of uninterupted wind flow. The forward and rearward turbines 16 and 18 rotate on a horizontal axis and are supported relative to a mounting structure or mast 24 which permits turning of the windmill assembly 12 about a generally vertical axis to align with the wind. The windmill assembly 12 is self aligning to the wind due to the downwind location of the larger diameter turbine 18 which is spaced from the mast 24 and the vertical axis of rotation a greater distance than the forward and smaller turbine 16.

The larger diameter turbine 18 rotates more slowly than the smaller diameter turbine 16 and the shafts 26 and 28 of the turbine 16 and 18 are geared together through a transmission 30 having a gear ratio selected to enable each turbine to operate at its maximum speed over an expected range of wind velocity.

The transmission 30 is connected to an electric generator 32 which delivers its output by way of electric conductors indicated at 34 in FIGS. 3 and 7. The windmill assemblies 12 include a base structure 36 having bearing supports 38 for shafts 26 and 28 of the forward and rearward turbines 16 and 18, respectively.

The mast 24 is made up of a pair of elongated box section members 40 and 42 which are of approximately equal length and taper from one end to the other with the inner, larger section welded or otherwise rigidly connected to the base 36 so that the upper and lower mast 40 and 42 are in substantially vertical alignment with each other. The shaft 26 passes through openings in the upper mast section 40.

As best seen in FIG. 1, one or more windmill assemblies 12 may be connected to flexible cables 44 suspended in generally parallel relationship to each other between support members which are indicated as being fabricated towers 46. The towers 46 are supported in a vertical position by means of guy cables 48. The cables 44 present generally vertically aligned pairs of mounting points which form sets to which windmill assemblies 12 may be connected as seen in FIG. 1. Four such windmill assemblies 12 are shown supported between three cables 44 but it will be understood that the arrangement can vary from a single windmill assembly between a pair of cables to a large number of windmill assemblies and a large number of vertically spaced cables.

The means by which the windmill assemblies 12 are connected to the cables 44 includes an upper connector assembly 50 and a lower connector assembly 52. As best seen in FIG. 5, the upper connector assembly 50 includes a hook member 54 having a depending shaft 56. The shaft 56 is mounted in a bearing assembly 58 formed within a tube 60 which is rigidly connected to the small end of the upper mast 40. The bearing assembly 58 permits swiveling of the hook 54 relative to the mast 40. The hook 54 is provided with a conventional catch 62 which is pivoted at 63 relative to hook 54. Catch 62 is spring-loaded to the position seen in FIG. 5 and maintains the hook opening closed. The upper end of the hook 54 is provided with an eye 64 by which a crane or the like may be used to lift the windmill assembly 12 to a desired position relative to the cables 44.

Cable clamps 66 such as illustrated in FIGS. 5 and 6 are installed on the cables 44 in vertical alignment with each other. Each of the cable clamps 66 are made up of two like parts 68 which are held together in clamped-relationship to the cable 44 by means of bolts 70. The cable clamps 66 each provide a pair of gates 72 in the form of notches. In the installed position the hook 54 is positioned in a selected one of the gates 72.

As best seen in FIG. 7, the lower mast 42 is provided with a main tubular member 74 which projects from the lower smaller end of the lower mast 42. The main tubular member 74 is open at its lower end to permit passage of the electrical conductors 34 and control wiring from the associated windmill assembly 12 and to extend to transmission equipment on the ground. A tubular sleeve 76 is mounted on the lower end of the main tubular member 74 and is held in axially fixed relationship on tube 74 by a second tube 78 as well as a ring like lock element 80 fixed to the lowermost point of the tube 74. Both of the tubes 76 and 78 are free to rotate relative to the tubular member 74. The sleeve 76 is provided with an offset bracket member 82, the lower end of which is forked so that the tines 84 are disposed at opposite sides of the cable 44 with the bight between the tines 84 received in one of the gates 72 of the cable clamp 66. The lower ends of the tines 84 are provided with appertures to receive a security bolt 86 to prevent displacement of the bracket member 82 from the cable clamp 66.

Referring now to FIG. 7, the tubular member 78 supports a coil type torsion spring 88. The lowest coil of the spring 88 has an extension 90 held by a clamp 92 to the bracket 82. The upper coil of the spring 88 has generally vertically extending projecting portion 94 which is seated in openings in a pair of spaced collars 96 rigidly fixed to the exterior of tube 78. The main tubular member 74 is provided with a tab 98 which is offset to one side and which is positioned to engage the projecting spring portion 94 upon rotation of the tube 74 relative to the tube 78.

Installation of windmill assemblies 12 is accomplished by preparing at least a pair of cables 44 and suspending them from space points such as the towers 46. Cable clamps 66 are attached to vertically spaced points in position to receive the upper and lower ends of the upper and lower mast 40, 42.

After cable clamps 66 are installed on the cables 44 a windmill assembly 12 can be lifted by a crane or helicopter through means of the eye 64 on the top of the hook 54. The forked bracket 82 is positioned in one of the gates 72 of the lower cable clamp 66 and the security bolt 86 is installed. Also the hook 54 is placed on the upper cable clamp 66 in one of the gates 72. Thereafter, the electric power conductors 34 are connected into adjacent lines not shown or are extended to ground power transmitting positions, also not shown. The reverse procedure is followed to remove a windmill assembly in the event it requires servicing or repair.

As shown in FIG. 1 windmill assemblies 12 may be supported one above the other in which case one of the gates 72 in the intermediate cable clamp 66 receives the forked bracket element 82 of the upper windmill assembly and the other gate 72 receives the hook 54 of the lower windmill assembly.

In the installed condition, each of the windmill assemblies 12 pivot about an axis passing through the masts 40 and 42. Pivoting is afforded by the shaft 56 extending from the hook 54 and by the tube 74, the end of which rotates in the sleeve 76. The wire conductors 34 are provided with sufficient slack so that they may wind up or twist a few revolutions during rotation of the windmill assembly 12 about its vertical axis.

Referring again to FIG. 1, windmill assemblies 12 are supported in an elevated position across the path of the prevailing winds. The windmill assemblies may weather-cock upon change in wind directions and can turn freely almost 180 degrees in either direction as the windmill turns to follow the wind. If the windmill assemblies should rotate more than the predetermined amount of about 180 degrees, the tab 98 will engage protecting portion 94 at the upper end of the spring 88. If the wind continues to shift in the same direction, the windmill assembly rotates the tab 98 and winds the torsion spring 88 on the sleeve 76. If the wind shifts continuously in the same direction, the spring 88 will be wound tightly and the force will be built up so that when the wind stops temporarily, or when the spring force is built up to a sufficient level, the spring 88 will unwind and rotate the windmill assemblies 12 in the opposite direction to unwind the electric conductors 34. This arrangement avoids the necessity of providing slip rings for the purpose of transferring electrical energy from the generator 32 to the fixed ground station.

In the present installation, the weight of the windmill assemblies is carried by the cables and the thrust forces due to the wind acting on the windmill assemblies 12 is divided between the upper and lower cables 44. The cables themselves afford a resilient mounting which helps to dampen vibrations and makes it possible to suspend the windmill assemblies above terrain without requiring elaborate preparation of the site.

A mounting arrangement for windmill assemblies has been provided in which one or more windmill units can be suspended from cables through attaching means attached to vertically spaced points on adjoining cables to permit pivotal movement about a generally vertical axis so that the windmill assemblies can follow shifts in the wind. A self-return spring arrangement is provided which permits the windmill assemblies to follow the direction of the wind without requiring slip rings or the like for the purpose of transmitting electrical energy from the moving windmill driven generator to a stationary position on the ground.

The embodiments of the invention in which an exclusive property or privilege is claimed are defined as follows:

1. A windmill structure comprising; a pair of substantially horizontal, flexible cable members suspended between supports, said cable members having first and second points on the cable members, respectively, vertically spaced and aligned relative to each other, a mounting structure, means connecting said mounting structure to both of said flexible cable members at said first and second points for rotation through at least one revolution of said mounting structure relative to said flexible members about a vertical axis passing through said points and said mounting structure, and a windmill supported on said mounting structure to rotate with said mounting structure in accordance with the direction of the wind.

2. The windmill structure of claim 1 in which said windmill has a horizontal axis of rotation and said axis is disposed substantially midway of said first and second points.

3. The combination of claim 1 and further comprising an additional flexible cable member with a third point on said additional flexible cable member vertically spaced and aligned with said first and second points, and an additional mounting structure disposed between said second and third points for rotation independently of said first mentioned mounting structure about a vertical axis.

4. The windmill structure of claim 1 and further comprising means to return said mounting structure to its original position after rotation of said structure a predetermined amount from its said original position.

5. The windmill structure of claim 1 and further comprising means resisting rotation of said mounting structure after a predetermined amount of free rotation in one direction and assisting rotation in the opposite direction.

6. A windmill structure comprising; a pair of flexible cable members suspended between supports said pair of cable members having first and second points, respectively, vertically spaced to each other, a mounting structure, means connecting said mounting structure to said flexible cable members for rotation through at least one revolution of said mounting structure relative to said flexible members about a vertical axis passing through said points and said mounting structure, and a windmill supported on said mounting structure, said connecting means including a swivel hook means at the upper end of said mounting structure for supporting the weight of said mounting structure and windmill.

7. The windmill structure of claim 6 wherein said connecting means includes a swivel fork at the lower end of said mounting structure for engagement with one of said flexible members.

8. A windmill structure comprising; a pair of flexible cable members suspended between supports said pair of cable members having first and second points, respectively vertically spaced to each other, a mounting structure, means connecting said mounting structure to said flexible members for rotation through at least one revolution of said mounting structure relative to said flexible members about a vertical axis passing through said points and said mounting structure, a windmill supported on said mounting structure, said windmill being a self aligned windmill, an electric generator on said mounting structure, power conductors extending from said generator to a point beyond said flexible members, and means between said flexible members and mounting structure to limit free rotation of said mounting structure to prevent excessive twisting of said conductors.

9. The windmill structure of claim 8 wherein said means limiting rotation includes resilient means resiliently resisting rotation in one direction with progressively increasing force.

10. A windmill structure comprising; a pair of flexible cable members suspended between supports said pair of cable members having first and second points, respectively, vertically spaced to each other, a mounting structure, means connecting said mounting structure to said flexible members for rotation through at least one revolution of said mounting structure relative to said flexible members about a vertical axis passing through said points and said mounting structure, and a windmill supported on said mounting structure, said windmill being self aligned to the direction of the wind to rotate said mounting structure about said vertical axis, and means resisting rotation of said mounting structure after a predetermined amount of free rotation, said means resisting rotation including a torsion spring having one end relatively stationary to one of said flexible members and the other end engagable with said mounting structure.

11. A windmill structure comprising; a pair of substantially horizontal flexible cable members suspended between supports, said pair of cable members having sets of mounting points, each of said sets comprising a first mounting point on one of said cable members and a second mounting point on the other of said cable members, at least a pair of mounting structures, means connecting each of said mounting structures to both of said flexible members at one of said sets of mounting points for rotation of that mounting structure relative to the associated mounting points about a vertical axis passing through that mounting structure and the associated set of mounting points, said mounting structures being rotatable through at least one revolution independently of each other, and a windmill supported on each of said mounting structures to rotate relative to its associated mounting structure about a horizontal axis and to rotate as a unit with the associated one of said mounting structures about a vertical axis in accordance with changes in the direction of wind and independently of the other of said mounting structures.

* * * * *

UNITED STATES PATENT AND TRADEMARK OFFICE
CERTIFICATE OF CORRECTION

PATENT NO. : 4,217,501
DATED : August 12, 1980
INVENTOR(S) : William D. Allison

It is certified that error appears in the above-identified patent and that said Letters Patent are hereby corrected as shown below:

Column 1, line 4, "In order take" should read --In order to take--
line 51, "number or windmill" should read --number of windmill--

*Signed and Sealed this*

*Twenty-fourth* Day of *March 1981*

[SEAL]

*Attest:*

RENE D. TEGTMEYER

*Attesting Officer*     *Acting Commissioner of Patents and Trademarks*